(12) United States Patent
Shimizu et al.

(10) Patent No.: US 7,448,631 B2
(45) Date of Patent: Nov. 11, 2008

(54) BRAIDING YARN MADE OF EXPANDED GRAPHITE, AND GLAND PACKING

(75) Inventors: Masao Shimizu, Sanda (JP); Seiichi Yamashita, Sanda (JP); Takahisa Ueda, Sanda (JP); Masaru Fujiwara, Sanda (JP); Akio Ohtani, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 11/093,064

(22) Filed: Mar. 29, 2005

(65) Prior Publication Data

US 2005/0218604 A1    Oct. 6, 2005

(30) Foreign Application Priority Data

Mar. 31, 2004 (JP) ............................. 2004-104046
Mar. 31, 2004 (JP) ............................. 2004-104070

(51) Int. Cl.
*F16J 15/22* (2006.01)
*D02G 3/36* (2006.01)

(52) U.S. Cl. ..................... 277/537; 277/538; 277/539; 57/212; 57/222

(58) Field of Classification Search ................. 277/534, 277/537–539; 57/212, 222, 235
See application file for complete search history.

(56) References Cited

U.S. PATENT DOCUMENTS

| 559,080 | A | * | 4/1896 | Hughes | ........................... 87/6 |
| 1,325,876 | A | * | 12/1919 | McClure | ..................... 428/365 |
| 1,840,449 | A | * | 1/1932 | Hubbard et al. | .............. 277/528 |
| 2,249,981 | A | * | 7/1941 | Roe | ........................... 277/537 |
| 2,722,861 | A | * | 11/1955 | Francis | ........................... 87/1 |
| 3,438,841 | A | * | 4/1969 | Zumeta et al. | ................. 57/232 |
| 5,339,520 | A | * | 8/1994 | Leduc | ........................ 29/888.3 |
| 5,549,306 | A | | 8/1996 | Ueda | |
| 5,699,680 | A | * | 12/1997 | Guerlet et al. | ................. 66/202 |
| 6,502,382 | B1 | | 1/2003 | Fujiwara et al. | |
| 6,644,007 | B2 | * | 11/2003 | Fujiwara et al. | ................ 57/210 |
| 7,140,171 | B2 | * | 11/2006 | Ueda et al. | ...................... 57/235 |
| 7,353,645 | B2 | * | 4/2008 | Ueda et al. | ...................... 57/235 |
| 2005/0238862 | A1 | * | 10/2005 | Ueda et al. | ............... 428/292.1 |

FOREIGN PATENT DOCUMENTS

| EP | 1 098 116 | 5/2001 |
| JP | 6-17937 | 1/1994 |
| WO | WO 2004/025149 | 3/2004 |

* cited by examiner

*Primary Examiner*—Alison K Pickard
(74) *Attorney, Agent, or Firm*—William L. Androlia; H. Henry Koda

(57) ABSTRACT

In a braiding yarn made of expanded graphite 1, a reinforcing wire member 3 made of a stainless steel wire which is easily plastically deformed, and having a diameter of 0.05 to 0.2 mm is spirally wound around the outer periphery of a twisted expanded graphite base member 2 having a width of 3 mm and a thickness of 0.38 mm, at a narrow pitch P of 0.5 to 5 mm without slack. Alternatively, the reinforcing wire member is wound so as to be embedded in the inner side of and along an edge 4 of an expanded graphite tape which is spirally exposed from the outer surface of the expanded graphite base member 2.

2 Claims, 13 Drawing Sheets

Fig.13

| Diameter of reinforcing wire member | Winding pitch | 1st cycle | 2nd cycle | 3rd cycle |
|---|---|---|---|---|
| 0.05 mm | 0.5 mm | None | None | None |
| | 1.0 mm | None | None | None |
| | 2.0 mm | None | None | None |
| | 3.0 mm | None | None | None |
| | 4.0 mm | None | None | None |
| | 5.0 mm | None | None | None |
| 0.1 mm | 0.5 mm | None | None | None |
| | 1.0 mm | None | None | None |
| | 2.0 mm | None | None | None |
| | 3.0 mm | None | None | None |
| | 4.0 mm | None | None | None |
| | 5.0 mm | None | None | None |
| 0.15 mm | 0.5 mm | None | None | None |
| | 1.0 mm | None | None | None |
| | 2.0 mm | None | None | None |
| | 3.0 mm | None | None | None |
| | 4.0 mm | None | None | None |
| | 5.0 mm | None | None | None |
| 0.2 mm | 0.5 mm | None | None | None |
| | 1.0 mm | None | None | None |
| | 2.0 mm | None | None | None |
| | 3.0 mm | None | None | None |
| | 4.0 mm | None | None | None |
| | 5.0 mm | None | None | None |

Fig.14

| Kind of braiding | 1st cycle | 2nd cycle | 3rd cycle |
|---|---|---|---|
| 8 strand square braiding | None | None | None |
| 16 strand square braiding | None | None | None |
| 24 strand square braiding | None | None | None |
| 32 strand square braiding | None | None | None |

BRAIDING YARN MADE OF EXPANDED GRAPHITE, AND GLAND PACKING

BACKGROUND OF THE INVENTION

1. Field of the Invention

The present invention relates to a braiding yarn made of expanded graphite which is suitable for a gland packing that is to be used in a shaft seal part of a fluid apparatus or the like, and also to such a gland packing.

2. Description of Related Art

Conventionally, a braiding yarn made of expanded graphite has been proposed in which plural expanded graphite tapes having a predetermined width are stacked to constitute an expanded graphite base member, and the outer periphery of the expanded graphite base member is externally reinforced by knitting or tubular-plain-stitching reinforcing wire members such as stainless steel wires (for example, see Japanese Patent Application Laying-Open No. 6-17937).

In the braiding yarn made of expanded graphite having this configuration, the outer periphery of the expanded graphite base member is covered by, for example, knitting reinforcing wire members such as stainless steel wires. During a process of braiding plural yarns to produce a gland packing, therefore, the knit of the reinforcing wire members sufficiently resists tensile and torsional forces produced in each of the yarns, whereby the expanded graphite base member in the knit is prevented from being broken.

However, the braiding yarn made of expanded graphite in which the outer surface of the expanded graphite base member is covered by knitting or tubular-plain-stitching reinforcing wire members such as stainless steel wires has a problem in that the process of covering the expanded graphite base member with knitting or tubular-plain-stitching the reinforcing wire members requires a long time period and hence the productivity is poor.

The inventor thought up a configuration in which an expanded graphite base member is externally reinforced by spirally winding a reinforcing wire member therearound.

However, it was found that, when such a braiding yarn made of expanded graphite is bent with a small radius of curvature, the reinforcing wire member on the inner peripheral side of the bent portion slacks, and the reinforcing wire member separates and protrudes from the outer face of the expanded graphite base member on the inner peripheral side of the bent portion.

In the case where the counter member is, for example, a rotation shaft, when such slack once occurs, the slack is repeatedly bent in the forward and reverse rotational directions of the rotation shaft in accordance with forward and reverse rotations of the rotation shaft. When time elapses, there arises a possibility that the basal portion of the slack is broken. When such breakage occurs, a broken surface may damage the counter member. In the case where the counter member is a stem, in accordance with reciprocal motion of the stem, such slack is repeatedly bent in the reciprocal directions, and, when time elapses, there arises a possibility that the basal portion of the slack is broken. When such breakage occurs, a broken surface may damage the counter member.

The invention has been conducted in order to solve the problems. It is an object of the invention to provide a braiding yarn made of expanded graphite in which a reinforcing wire member is spirally wound around an expanded graphite base member, and, even when the braiding yarn is bent with a small radius of curvature, the reinforcing wire member can be surely prevented from slacking on the inner peripheral side of the bent portion, and the sealing property is not impaired, and also a gland packing in which such a braiding yarn made of expanded graphite is used.

In the braiding yarn disclosed in Japanese Patent Application Laying-Open No. 6-17937, most of the outer surface of the expanded graphite base member is covered by the knitted or tubular-plain-stitched reinforcing wire members such as stainless steel wires, and therefore there is a problem in that the adaptability and sealing property with respect to a counter member such as a rotation shaft or a stem (hereinafter, referred to merely as "counter member") which are characteristics of the expanded graphite base member cannot be sufficiently exerted. As shown in FIG. 16, in a braiding yarn 1, the outer surface of an expanded graphite base member 2 is covered by knitting or tubular-plain-stitching reinforcing wire members 3. As shown in FIG. 15, a plurality of such braiding yarns 1 are braided or twisted to constitute a gland packing G, and the gland packing G is inserted into a packing box A and pressed by a packing gland B. When the braiding yarns 1 of the gland packing G are compressed in the directions C in FIG. 16, the expansion amount by which the expanded graphite base member 2 tends to outward expand between the reinforcing wire members 3 adjacent to each other on the outer surface, as indicated by the broken line e is reduced. Therefore, the contact with a counter member 9 at a sufficient contact pressure and a sufficient contact area becomes insufficient, and the adaptability and sealing property with respect to the counter member 9 are reduced.

The invention has been conducted in order to solve the problems. It is another object of the invention to provide a braiding yarn made of expanded graphite which has sufficient resistance due to external reinforcement against tensile and torsional forces produced in each of yarns during a process of producing a gland packing, and in which the productivity can be enhanced, and the adaptability and sealing property with respect to a counter member can be improved.

It is a further object of the invention to provide a gland packing in which an externally reinforced braiding yarn is used, and in which the adaptability and sealing property with respect to a counter member can be improved.

SUMMARY OF THE INVENTION

The braiding yarn made of expanded graphite of the invention is a braiding yarn made of expanded graphite in which an expanded graphite base member is externally reinforced by a reinforcing wire member, and characterized in that the reinforcing wire member is configured by a thin wire member having a diameter of 0.05 to 0.2 mm, and the reinforcing wire member is spirally wound around an outer periphery of the expanded graphite base member at a narrow pitch of 0.5 to 5 mm without slack.

In the braiding yarn made of expanded graphite of the invention, preferably, the reinforcing wire member is wound around the outer periphery of the expanded graphite base member by a tightening force of 0.1 to 30 N without slack.

In the braiding yarn made of expanded graphite of the invention, preferably, the reinforcing wire member is configured by a metal wire.

In the braiding yarn made of expanded graphite of the invention, preferably, internal reinforcing members are embedded in the expanded graphite base member.

In the braiding yarn made of expanded graphite of the invention, preferably, the reinforcing wire member such as the metal wire is wound around the expanded graphite base member as at least a single spiral.

In the braiding yarn made of expanded graphite of the invention, preferably, the reinforcing wire member such as the metal wire is wound around the expanded graphite base member as at least two spirals which intersect with each other.

The gland packing of the invention is a gland packing in which a plurality of braiding yarns are braided or twisted, and characterized in that each of the braiding yarns is formed by externally reinforcing an expanded graphite base member by means of a reinforcing wire member, the reinforcing wire member is configured by a thin wire member having a diameter of 0.05 to 0.2 mm, and the reinforcing wire member is spirally wound around an outer periphery of the expanded graphite base member at a narrow pitch of 0.5 to 5 mm without slack.

In the gland packing of the invention, preferably, the reinforcing wire member is wound around the outer periphery of the expanded graphite base member by a tightening force of 0.1 to 30 N without slack.

In the gland packing of the invention, preferably, the reinforcing wire member is configured by a metal wire.

In the gland packing of the invention, preferably, internal reinforcing members are embedded in the expanded graphite base member.

In the gland packing of the invention, preferably, the reinforcing wire member is wound around the expanded graphite base member as at least a single spiral.

In the gland packing of the invention, preferably, the reinforcing wire member is wound around the expanded graphite base member as at least two spirals which intersect with each other.

The other braiding yarn made of expanded graphite of the invention is characterized in that a thin reinforcing wire member having a diameter of 0.05 to 0.2 mm is spirally embedded in a longitudinal direction on an outer surface side of an expanded graphite base member. In this case, as the reinforcing wire member, various wire members including: organic wire members such as rayon, phenol, aramid, PBI, PBO, PTFE, PPS, and PEEK; inorganic wire members such as glass fibers, carbon fibers, and ceramic fibers; wire members of mineral fibers; and metal wire members such as stainless steel, inconel, and monel can be selectively used in accordance with the use.

In the other braiding yarn made of expanded graphite of the invention, preferably, the expanded graphite base member is formed by a twisted expanded graphite tape, and the reinforcing wire member is embedded in an inner side of and along an edge of the expanded graphite tape which is spirally exposed from an outer surface of the twisted expanded graphite base member.

In the other braiding yarn made of expanded graphite of the invention, preferably, the reinforcing wire member is spirally embedded in a state where part or whole of a section of the reinforcing wire member bites into an outer surface of the expanded graphite base member.

The other gland packing of the invention is a gland packing in which a plurality of braiding yarns are braided or twisted, and characterized in that, in each of the braiding yarns, a thin reinforcing wire member having a diameter of 0.05 to 0.2 mm is spirally embedded in a longitudinal direction on an outer surface side of an expanded graphite base member. In this case, in the same manner as described above, as the reinforcing wire member, various wire members including: organic wire members such as rayon, phenol, aramid, PBI, PBO, PTFE, PPS, and PEEK; inorganic wire members such as glass fibers, carbon fibers, and ceramic fibers; wire members of mineral fibers; and metal wire members such as stainless steel, inconel, and monel can be selectively used in accordance with the use.

In the other gland packing of the invention, preferably, the expanded graphite base member of the braiding yarn is formed by a twisted expanded graphite tape, and the reinforcing wire member is embedded in an inner side of and along an edge of the expanded graphite tape which is spirally exposed from an outer surface of the twisted expanded graphite base member.

In the other gland packing of the invention, preferably, the reinforcing wire member of the braiding yarn is spirally embedded in a state where part or whole of a section of the reinforcing wire member bites into an outer surface of the expanded graphite base member.

The invention exerts the following functions and effects.

According to the braiding yarn made of expanded graphite of the invention, the reinforcing wire member is configured by a thin wire member having a diameter of 0.05 to 0.2 mm, and the reinforcing wire member is wound around an outer periphery of the expanded graphite base member at a narrow pitch of 0.5 to 5 mm without slack. Therefore, it is possible to attain an effect that, even when the braiding yarn made of expanded graphite is bent with a small radius of curvature, the reinforcing wire member is surely prevented from slacking on the inner peripheral side of the bent portion, and the sealing property is not impaired.

As the reinforcing wire member, various wire members including: organic wire members (for example, rayon, phenol, aramid, PBI, PBO, PTFE, PPS, and PEEK); inorganic wire members (for example, glass fibers, carbon fibers, and ceramic fibers); wire members of mineral fibers; and metal wire members (for example, stainless steel, inconel, and monel) can be selectively used in accordance with the use.

According to the braiding yarn made of expanded graphite of the invention, the reinforcing wire member is wound around the outer periphery of the expanded graphite base member by a tightening force of 0.1 to 30 N. Even when the braiding yarn is bent with a small radius of curvature, therefore, it is possible to more surely prevent the reinforcing wire member from slacking on the inner peripheral side of the bent portion.

According to the braiding yarn made of expanded graphite of the invention, the reinforcing wire member is configured by a metal wire. A metal wire is easily plastically deformed. When the reinforcing wire member is spirally wound around the outer periphery of the expanded graphite base member, therefore, the reinforcing wire member is plastically deformed so as be adapted more preferably to the expanded graphite base member, and more surely prevented from slacking.

According to the braiding yarn made of expanded graphite of the invention, internal reinforcing members (for example, organic, inorganic, mineral, or metal fiber members, or organic, inorganic, mineral, or metal wire members) are embedded in the expanded graphite base member. Therefore, the tensile and torsional strengths of the expanded graphite base member itself are improved.

According to the braiding yarn made of expanded graphite of the invention, the reinforcing wire member is wound around the expanded graphite base member as at least a single spiral without slack. Even when the braiding yarn made of expanded graphite is bent with a small radius of curvature, therefore, the metal wire can be surely prevented from slacking on the inner peripheral side of the bent portion.

According to the braiding yarn made of expanded graphite of the invention, the reinforcing wire member is wound around the expanded graphite base member as at least two spirals which intersect with each other. Even when the braiding yarn made of expanded graphite is bent with a small radius of curvature, therefore, the metal wire can be surely prevented from slacking on the inner peripheral side of the bent portion.

According to the gland packing of the invention, the reinforcing wire member in each of braided or twisted braiding yarns is configured by a thin wire having a diameter of 0.05 to 0.2 mm, and the reinforcing wire member is spirally wound around an outer periphery of the expanded graphite base member at a narrow pitch of 0.5 to 5 mm without slack. As a result, even when the gland packing is bent with a small radius of curvature, it is possible to surely prevent the reinforcing wire member from slacking on the inner peripheral side of the bent portion. Moreover, the sealing property is not impaired.

As the reinforcing wire member, as described above, various wire members including: organic wire members (for example, rayon, phenol, aramid, PBI, PBO, PTFE, PPS, and PEEK); inorganic wire members (for example, glass fibers, carbon fibers, and ceramic fibers); wire members of mineral fibers; and metal wire members (for example, stainless steel, inconel, and monel) can be selectively used in accordance with the use.

According to the gland packing of the invention, in the state where the reinforcing wire member is wound around the outer periphery of the expanded graphite base member by a tightening force of 0.1 to 30 N, even when the gland packing is bent with a small radius of curvature, it is possible to more surely prevent the reinforcing wire member from slacking on the inner peripheral side of the bent portion.

According to the gland packing of the invention, the reinforcing wire member is configured by a metal wire. A metal wire is easily plastically deformed. When the reinforcing wire member is spirally wound around the outer periphery of the expanded graphite base member, therefore, the reinforcing wire member is plastically deformed so as be adapted more preferably to the expanded graphite base member, and more surely prevented from slacking.

The metal wire is adapted more preferably to the outer periphery of the expanded graphite base member, and spirally wound therearound without slack. Even when the gland packing is bent with a small radius of curvature, it is possible to more surely prevent the reinforcing wire member from slacking on the inner peripheral side of the bent portion.

According to the gland packing of the invention, the internal reinforcing members (for example, organic, inorganic, mineral, or metal fiber members, or organic, inorganic, mineral, or metal wire members) are embedded in the expanded graphite base member. Therefore, a gland packing having a high pressure resistance can be obtained. Moreover, places of the expanded graphite base member where a crack is produced during a braiding or twisting process can be reduced, and a more preferable sealing property can be obtained.

According to the gland packing of the invention, a metal wire is wound around the expanded graphite base member as at least a single spiral. Even when the gland packing is bent with a small radius of curvature, therefore, the metal wire can be surely prevented from slacking on the inner peripheral side of the bent portion.

According to the gland packing of the invention, a metal wire is wound around the expanded graphite base member as at least two spirals which intersect with each other. Even when the gland packing is bent with a small radius of curvature, therefore, the metal wire can be surely prevented from slacking on the inner peripheral side of the bent portion.

According to the other braiding yarn made of expanded graphite of the invention, the reinforcing wire member is configured by a thin wire having a diameter of 0.05 to 0.2 mm, and the thin reinforcing wire member is spirally embedded in a longitudinal direction on the outer surface side of the expanded graphite base member. Therefore, the reinforcing wire member resists tensile and torsional forces produced in each of the yarns during a process of producing the gland packing, and the expanded graphite base member is prevented from being broken.

Since the reinforcing wire member is requested simply to be spirally wound around the outer periphery of the expanded graphite base member, moreover, the time period required in the process of the winding is very shorter than that required in the process of covering through knitting or tubular-plain-stitching in the conventional art, and therefore the productivity can be enhanced.

The reinforcing wire member is configured by a thin wire having a diameter of 0.05 to 0.2 mm, and spirally embedded in the outer periphery of the expanded graphite base member. Therefore, the contact pressure and area of the expanded graphite base member with respect to a counter member such as a rotation shaft or a stem can be sufficiently ensured as compared with a conventional braiding yarn configured by an expanded graphite base member which is mostly covered by knitted or tubular-plain-stitched reinforcing wire members. Therefore, it is possible to attain an effect that the adaptability and sealing property with respect to a counter member can be improved.

According to the other braiding yarn made of expanded graphite of the invention, the expanded graphite base member which is configured by twisting an expanded graphite tape can improve the tensile and torsional strengths of the expanded graphite base member itself, and the improved strengths cooperate with the reinforcing action of the reinforcing wire member, so that a braiding yarn made of expanded graphite which is highly resistant to tension and torsion can be obtained. Since the reinforcing wire member is embedded in the inner side of and along an edge of the spiral expanded graphite tape of the expanded graphite base member, moreover, the whole outer surface of the expanded graphite base member can be exposed. Therefore, the contact pressure and area of the expanded graphite base member with respect to a counter member can be easily ensured, and the adaptability and sealing property can be further improved.

According to the other braiding yarn made of expanded graphite of the invention, the reinforcing wire member is spirally embedded in a state where part or whole of a section of the reinforcing wire member bites into the outer surface of the expanded graphite base member. Therefore, the outer surface of the expanded graphite base member can be made closer to a counter member by a degree corresponding to the biting amount. When the expanded graphite base member receives an external compression load to expand, the contact pressure and area with respect to the counter member can be easily ensured, and the adaptability and sealing property with respect to the counter member can be further improved.

According to the other gland packing of the invention, in each of the plural braided or twisted branding yarns, a thin reinforcing wire member having a diameter of 0.05 to 0.2 mm is spirally embedded in the longitudinal direction on an outer surface side of an expanded graphite base member. Therefore, the reinforcing wire member can exert a sufficient resistance force due to the external reinforcement against tensile and torsional forces produced in each of the yarns during a process of producing the gland packing. Since the reinforcing wire member is requested simply to be spirally wound around the outer periphery of the expanded graphite base member, moreover, the time period required in the process of the winding is very shorter than that required in the process of covering through knitting or tubular-plain-stitching in the conventional art, and therefore the productivity can be enhanced. The reinforcing wire member is configured by a thin wire having a diameter of 0.05 to 0.2 mm, and spirally embedded in the outer periphery of the expanded graphite base member. Therefore, the contact pressure and area of the expanded graphite base member with respect to a counter member can be sufficiently ensured as compared with those in a conventional braiding yarn configured by an expanded graphite base member which is mostly covered by knitted or tubular-plain-stitched reinforcing wire members. Consequently, the adaptability and sealing property with respect to the counter member can be improved.

According to the other gland packing of the invention, the expanded graphite base member of the braiding yarn is formed by twisting an expanded graphite tape. Therefore, the tensile and torsional strengths of the expanded graphite base member itself can be improved, and the improved strengths cooperate with the reinforcing action of the reinforcing wire member, so that a braiding yarn made of expanded graphite which is highly resistant to tension and torsion can be obtained. Since the reinforcing wire member is embedded in the inner side of and along an edge of the spiral expanded graphite tape of the expanded graphite base member, moreover, it is possible to obtain a gland packing which is excellent in adaptability and sealing property with respect to a counter member.

According to the other gland packing of the invention, the reinforcing wire member of the braiding yarn is spirally embedded in a state where part or whole of a section of the reinforcing wire member bites into the outer periphery of the expanded graphite base member. Therefore, it is possible to obtain a gland packing in which the contact pressure and area of the expanded graphite base member with respect to a counter member is easily ensured and the adaptability and sealing property with respect to a counter member are excellent.

BRIEF DESCRIPTION OF THE DRAWINGS

FIG. 13 is a table showing results of leakage tests of braiding yarns made of expanded graphite using hot water;

FIG. 14 is a table showing results of leakage tests of gland packings using hot water;

DESCRIPTION OF THE PREFERRED EMBODIMENTS

Hereinafter, a first embodiment of the invention will be described with reference to the accompanying drawings.

Figure 1A:
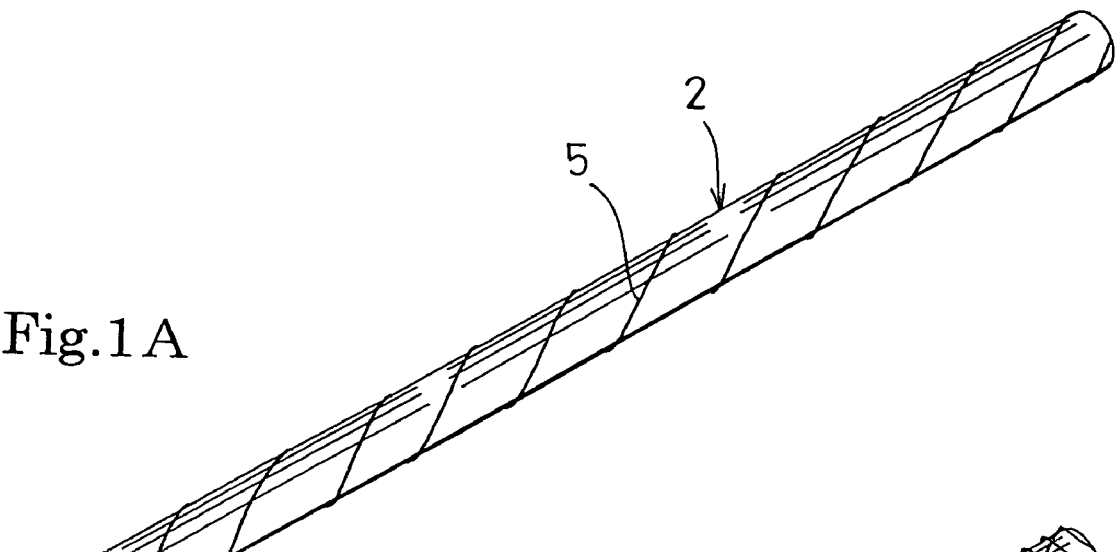
FIG. 1A is a perspective view showing an embodiment of an expanded graphite base member which is twisted.
Figure 1B:
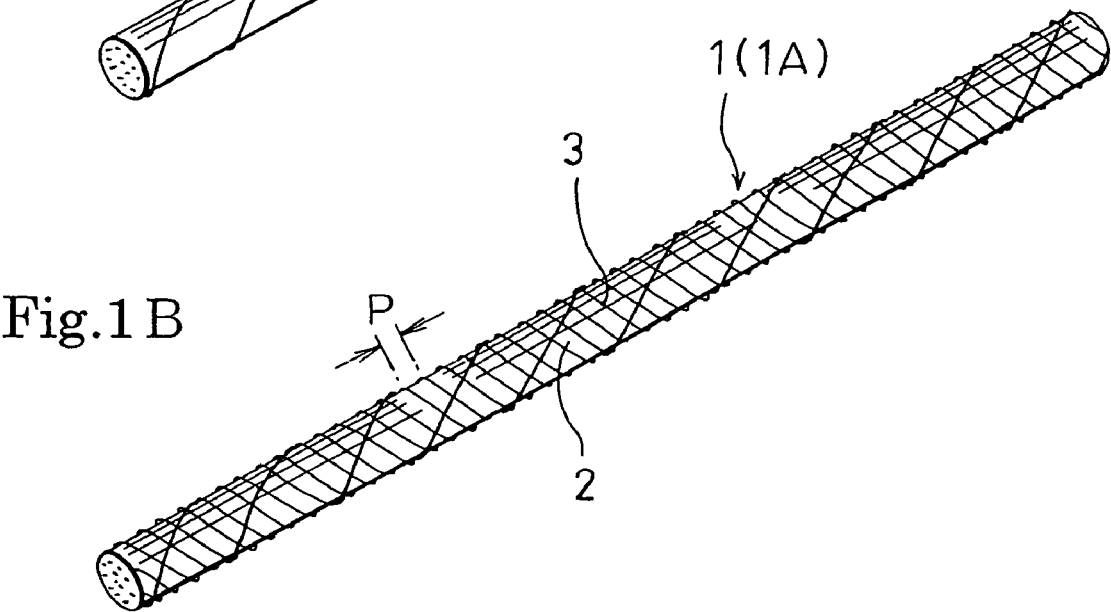
FIG. 1B is a perspective view showing an embodiment of a braiding yarn made of expanded graphite according to the invention of claim 1 or 5.

FIGS. 1A and 1B are perspective views respectively showing embodiments of a braiding yarn made of expanded graphite according to the inventions of claims 1 and 5. Referring to the figures, the braiding yarn made of expanded graphite 1 is configured by, as shown in FIG. 1B, winding a reinforcing wire member 3 formed by a metal wire which is easily plastically deformed, at a narrow pitch P of 0.5 to 5 mm, preferably 1 to 3 mm without slack as a single spiral around the outer periphery of an expanded graphite base member 2 which, as shown in FIG. 1A, is obtained by twisting an expanded graphite tape 5 having a width of 2 to 30 mm (preferably, 10 to 30 mm) and a thickness of 0.1 to 0.5 mm (preferably, 0.2 to 0.4 mm).

As the reinforcing wire member 3, a thin wire member of stainless steel (SUS 304) having a diameter of 0.05 to 0.2 mm, preferably 0.1 to 0.2 mm is used. The braiding yarn made of expanded graphite 1 is configured by winding the stainless steel wire around the outer periphery of the expanded graphite base member 2 by a tightening force of 0.1 to 30 N, preferably 10 to 20 N without slack.

As described above, the reinforcing wire member 3 is configured by the thin wire member having a diameter of 0.05 to 0.2 mm, and the thin reinforcing wire member 3 is spirally wound at a narrow pitch P of 0.5 to 5 mm around the outer periphery of the expanded graphite base member 2 without slack. Even when the braiding yarn made of expanded graphite 1 is bent with a small radius of curvature, therefore, the reinforcing wire member 3 can be surely prevented from slacking on the inner peripheral side of the bent portion, and the contact pressure and area of the expanded graphite base member 2 with respect to a counter member such as a rotation shaft or a stem can be sufficiently ensured, whereby the adaptability and sealing property with respect to a counter member can be improved.

Figure 1C:
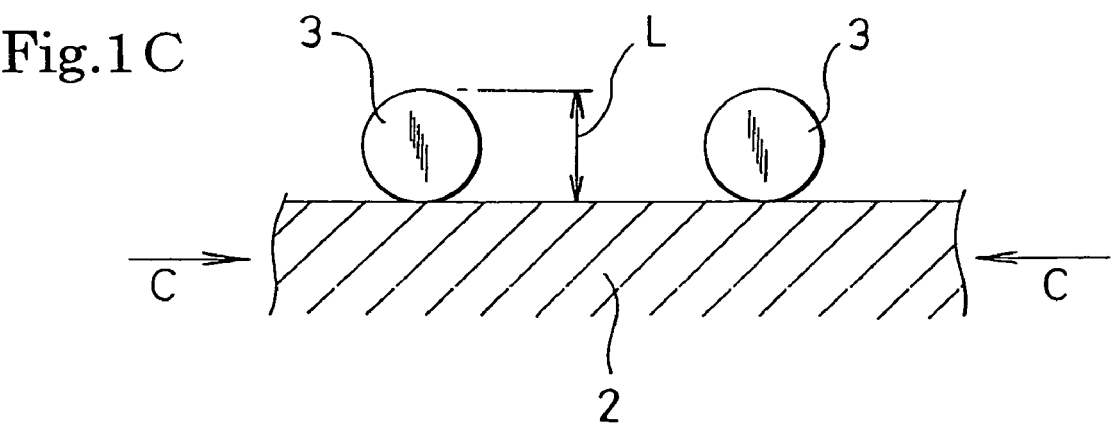
FIG. 1C is a view showing distance relationships between an outer face of an expanded graphite base member 2 and the apex of the outer face of a reinforcing wire member.
Figure 6:
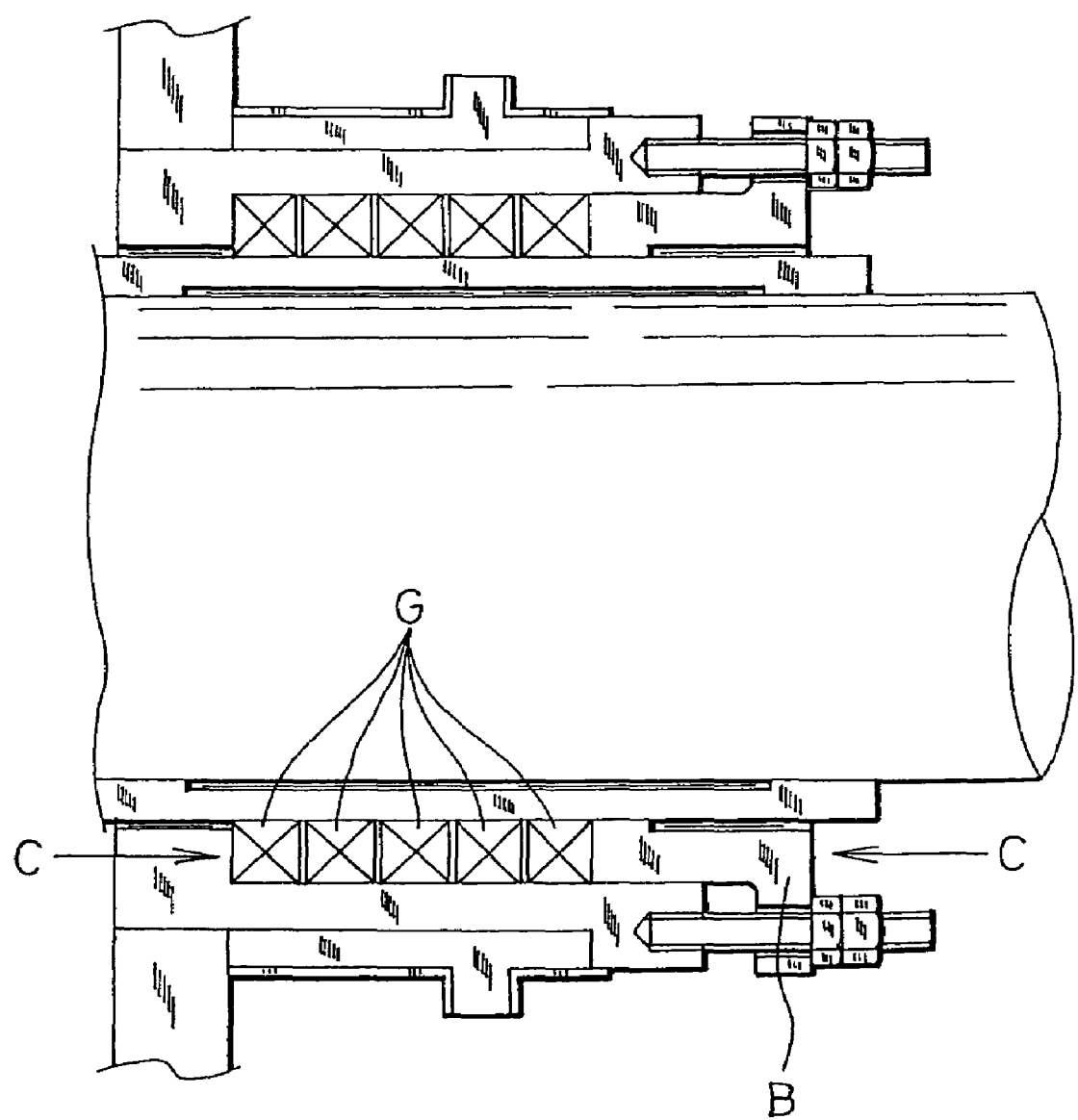
FIG. 6 is a diagram showing an example of a manner of using a gland packing.

When the diameter of the reinforcing wire member 3 is smaller than 0.05 mm, the reinforcing wire member 3 is easily broken away during the winding process by the tightening force of 0.1 to 30 N, and the assuredness of the tight spiral winding on the outer periphery of the expanded graphite base member 2 without slack is lowered. When the diameter of the reinforcing wire member 3 is larger than 0.2 mm, the distance L between the outer face of the expanded graphite base member 2 and the apex of the outer face of the reinforcing wire member 3 is increased as shown in FIG. 1C. As a result, when a gland packing G is configured by braiding or twisting a plurality of such braiding yarns, and the gland packing G is inserted into a packing box and pressed by a packing gland B as shown in FIG. 6, thereby compressing (in the directions C in the figure) the braiding yarns 1 of the gland packing G, the expansion amount by which the expanded graphite base member 2 of each braiding yarn 1 tends to outward expand between the reinforcing wire members 3, 3 is reduced. Therefore, the contact with a counter member at a sufficient contact pressure and a sufficient contact area becomes insufficient, and the adaptability and sealing property are reduced. As a result, it is preferable to configure the reinforcing wire member 3 by a thin wire having a diameter of 0.05 to 0.2 mm, preferably 0.1 to 0.2 mm.

When the pitch P of the spirally wound reinforcing wire member 3 is smaller than 0.5 mm, the surface coverage ratio of the reinforcing wire member 3 is excessively high. Therefore, the expanded graphite base member 2 hardly outward expands, the contact area of the expanded graphite base member 2 with respect to the counter member is reduced, and the adaptability and sealing property are reduced. When the pitch P is larger than 5 mm, even in the case where the reinforcing wire member 3 is wound around the outer periphery of the expanded graphite base member 2 without slack, the winding angle of the reinforcing wire member 3 with respect to the axis of the twisted expanded graphite base member 2 becomes small, and the reinforcing wire member 3 easily slacks. Therefore, it is necessary to wind the reinforcing wire member 3 around the outer periphery of the expanded graphite base member 2 at a narrow pitch of 0.5 to 5 mm.

The spiral winding of the reinforcing wire member 3 is not restricted to the single-spiral winding such as shown in FIG. 1A, and may be formed as two spirals which are wound in opposite directions to intersect with each other.

When the reinforcing wire member 3 is wound as two spirals around the outer periphery of the expanded graphite base member 2 without slack in this way, the reinforcing action of the reinforcing wire member 3 is largely enhanced as compared with that in the configuration where the reinforcing wire member is wound as a single spiral. Therefore, the situation where the braiding yarn is cut off during a braiding or twisting process for forming a gland packing is less caused, and places of the expanded graphite base member 2 where a crack is produced can be remarkably reduced.

Figure 3:
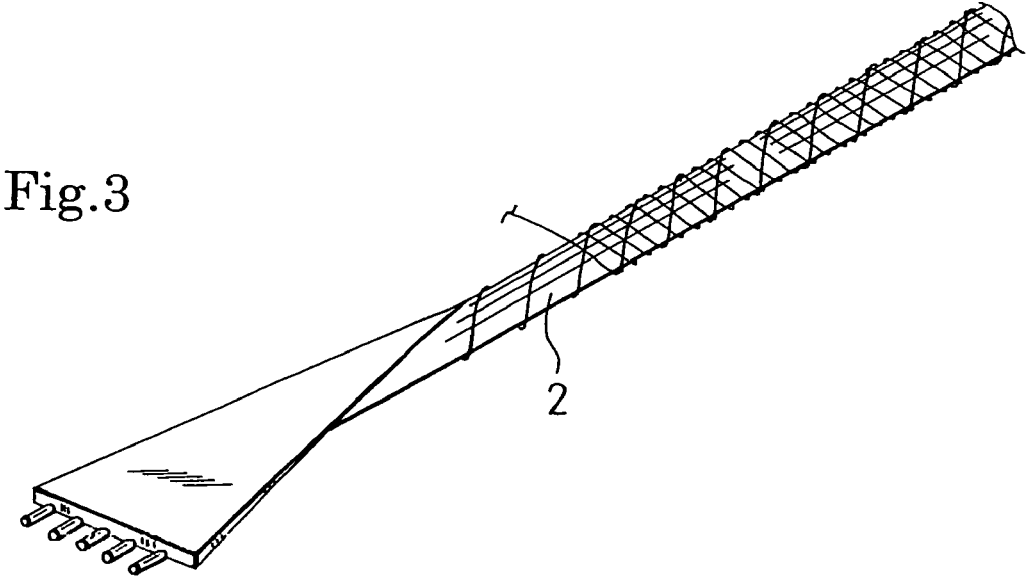
FIG. 3 is a perspective view showing an embodiment of a braiding yarn made of expanded graphite according to the invention of claim 4.

As shown in FIG. 3, a plurality of inner reinforcing members 6 may be embedded so as to elongate in the longitudinal direction with being separated from one another in the width direction of the expanded graphite tape. The filament-like inner reinforcing members 6 are not restricted to metal fibers, and may be organic fibers such as cotton, rayon, phenol, aramid, PBI, PBO, PTFE, PPS, and PEEK, or inorganic fibers such as glass fibers, carbon fibers, and ceramic fibers. The inner reinforcing members 6 are not restricted to have a filament-like shape, and may be embedded by mixing such metal fibers, inorganic fibers, or organic fibers into the expanded graphite base member 2.

When the inner reinforcing members 6 are embedded as described above, places of the expanded graphite base member 2 where a crack is produced during a braiding or twisting process for forming a gland packing are remarkably reduced.

EXAMPLE 1-1

Figure 2:
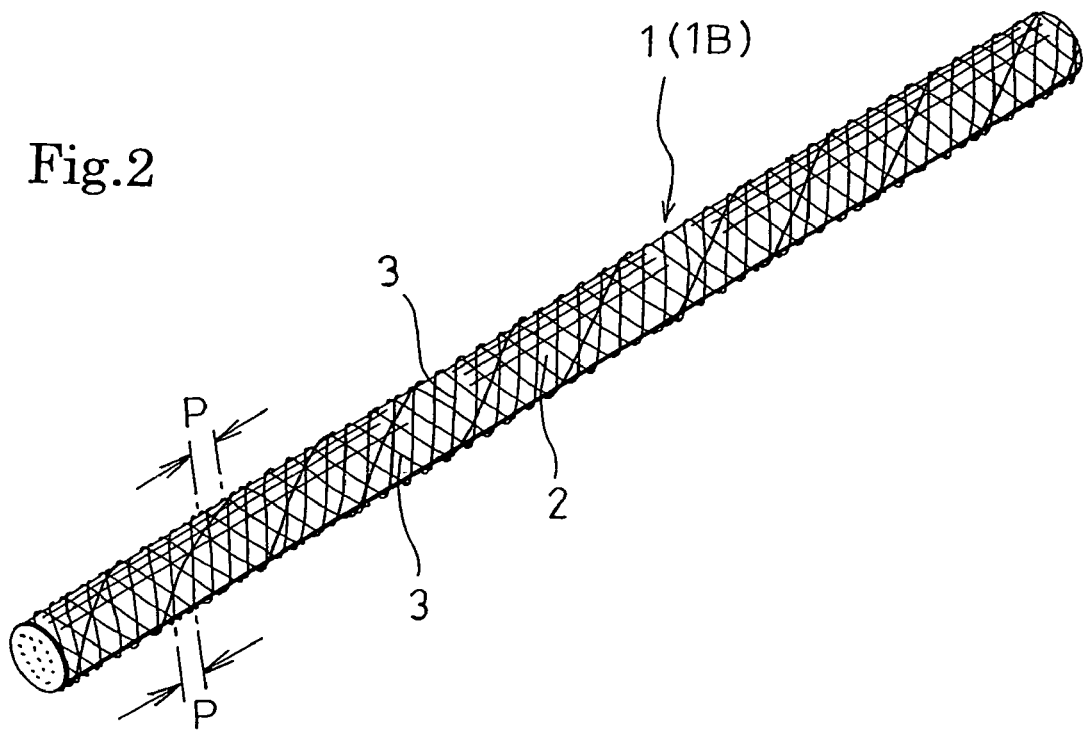
FIG. 2 is a perspective view showing an embodiment of a braiding yarn made of expanded graphite according to the invention of claim 6.

Expanded graphite tapes having a width of 20 mm and a thickness of 0.2 mm were twisted to form expanded graphite base members 2. The reinforcing wire member 3 of a stainless steel wire having a diameter of 0.05 to 0.2 mm was wound as a single spiral around the outer periphery of each of the base members at a pitch of 0.5 to 6.0 mm without slack, thereby producing braiding yarns made of expanded graphite 1A having an outer diameter of about 3 mm (the configuration of FIG. 1B). The reinforcing wire members 3 having the same diameter range as described above were wound as two spirals which intersect with each other, around each expanded graphite base member 2 at the same pitch as described above without slack, thereby producing braiding yarns made of expanded graphite 1B having an outer diameter of about 3 mm (the configuration of FIG. 2). The braiding yarns made of expanded graphite 1A, 1B were bent with a radius of curvature of inner periphery of 2 mm or 1 mm, and presence or absence of a slack in the reinforcing wire members 3 on the inner peripheral side of the bent portion was observed. The results are listed in Table 1 below.

TABLE 1

| Diameter of reinforcing wire member | Winding pitch of reinforcing wire member | Radius of curvature of inner periphery | Slack on inner peripheral side |
| --- | --- | --- | --- |
| 0.05 mm | 0.5 mm | 2 mm | None |
| | 0.5 mm | 1 mm | None |
| | 1.0 mm | 2 mm | None |
| | 1.0 mm | 1 mm | None |
| | 2.0 mm | 2 mm | None |
| | 2.0 mm | 1 mm | None |
| | 3.0 mm | 2 mm | None |
| | 3.0 mm | 1 mm | None |
| | 4.0 mm | 2 mm | None |
| | 4.0 mm | 1 mm | None |
| | 5.0 mm | 2 mm | None |
| | 5.0 mm | 1 mm | None |
| | 6.0 mm | 2 mm | None |
| | 6.0 mm | 1 mm | Observed |
| 0.1 mm | 0.5 mm | 2 mm | None |
| | 0.5 mm | 1 mm | None |
| | 1.0 mm | 2 mm | None |
| | 1.0 mm | 1 mm | None |
| | 2.0 mm | 2 mm | None |
| | 2.0 mm | 1 mm | None |
| | 3.0 mm | 2 mm | None |
| | 3.0 mm | 1 mm | None |
| | 4.0 mm | 2 mm | None |
| | 4.0 mm | 1 mm | None |
| | 5.0 mm | 2 mm | None |
| | 5.0 mm | 1 mm | None |
| | 6.0 mm | 2 mm | None |
| | 6.0 mm | 1 mm | Observed |
| 0.15 mm | 0.5 mm | 2 mm | None |
| | 0.5 mm | 1 mm | None |
| | 1.0 mm | 2 mm | None |
| | 1.0 mm | 1 mm | None |
| | 2.0 mm | 2 mm | None |
| | 2.0 mm | 1 mm | None |

TABLE 1-continued

| Diameter of reinforcing wire member | Winding pitch of reinforcing wire member | Radius of curvature of inner periphery | Slack on inner peripheral side |
|---|---|---|---|
| | 3.0 mm | 2 mm | None |
| | 3.0 mm | 1 mm | None |
| | 4.0 mm | 2 mm | None |
| | 4.0 mm | 1 mm | None |
| | 5.0 mm | 2 mm | None |
| | 5.0 mm | 1 mm | None |
| | 6.0 mm | 2 mm | None |
| | 6.0 mm | 1 mm | Observed |
| 0.2 mm | 0.5 mm | 2 mm | None |
| | 0.5 mm | 1 mm | None |
| | 1.0 mm | 2 mm | None |
| | 1.0 mm | 1 mm | None |
| | 2.0 mm | 2 mm | None |
| | 2.0 mm | 1 mm | None |
| | 3.0 mm | 2 mm | None |
| | 3.0 mm | 1 mm | None |
| | 4.0 mm | 2 mm | None |
| | 4.0 mm | 1 mm | None |
| | 5.0 mm | 2 mm | None |
| | 5.0 mm | 1 mm | None |
| | 6.0 mm | 2 mm | None |
| | 6.0 mm | 1 mm | Observed |

As seen from Table 1 above, when the diameter of the reinforcing wire member 3 is 0.05 to 0.2 mm and the winding pitch P of the reinforcing wire member 3 is 0.5 to 6.0 mm, in the all of the braiding yarns made of expanded graphite 1A, 1B, no slack was observed in the reinforcing wire member 3 on the inner peripheral side of the bent portion in the case where the braiding yarn was bent with a radius of curvature of 2 mm. By contrast, when the radius of curvature of the inner periphery was 1 mm, in the all of the braiding yarns made of expanded graphite 1A, 1B, a slack was observed in the reinforcing wire member 3 on the inner peripheral side of the bent portion in the case where the winding pitch P of the reinforcing wire member 3 was 6.0 mm.

Braiding yarns made of expanded graphite 1A, 1B, which are identical with the braiding yarns made of expanded graphite 1A, 1B having the single and two spiral configurations produced in the experiment of Table 1 above, were produced. The braiding yarns made of expanded graphite 1A, 1B were formed into a ring-like shape having inner diameter of 32 mm, and used for sealing a stem. Under conditions of the tightening pressure of 39.2 MPa and the pressure of hot water×the temperature: 17.2 MPa×350° C., leaking of the hot water was checked after first, second, and third cycles of three hours (500 reciprocations). The results are listed in Table 2 below.

TABLE 2

| Diameter of reinforcing wire member | Winding pitch | 1st cycle | 2nd cycle | 3rd cycle |
|---|---|---|---|---|
| 0.05 mm | 0.5 mm | None | None | None |
| | 1.0 mm | None | None | None |
| | 2.0 mm | None | None | None |
| | 3.0 mm | None | None | None |
| | 4.0 mm | None | None | None |
| | 5.0 mm | None | None | None |
| 0.1 mm | 0.5 mm | None | None | None |
| | 1.0 mm | None | None | None |
| | 2.0 mm | None | None | None |
| | 3.0 mm | None | None | None |
| | 4.0 mm | None | None | None |

TABLE 2-continued

| Diameter of reinforcing wire member | Winding pitch | 1st cycle | 2nd cycle | 3rd cycle |
|---|---|---|---|---|
| | 5.0 mm | None | None | None |
| 0.15 mm | 0.5 mm | None | None | None |
| | 1.0 mm | None | None | None |
| | 2.0 mm | None | None | None |
| | 3.0 mm | None | None | None |
| | 4.0 mm | None | None | None |
| | 5.0 mm | None | None | None |
| 0.2 mm | 0.5 mm | None | None | None |
| | 1.0 mm | None | None | None |
| | 2.0 mm | None | None | None |
| | 3.0 mm | None | None | None |
| | 4.0 mm | None | None | None |
| | 5.0 mm | None | None | None |

As shown in Table 2 above, it was ascertained that, in the all of the braiding yarns made of expanded graphite 1A, 1B, leakage did not occur, and the sealing property is not adversely affected.

Next, embodiments of the gland packing of the invention according to claim 7 will be described.

Figure 4:
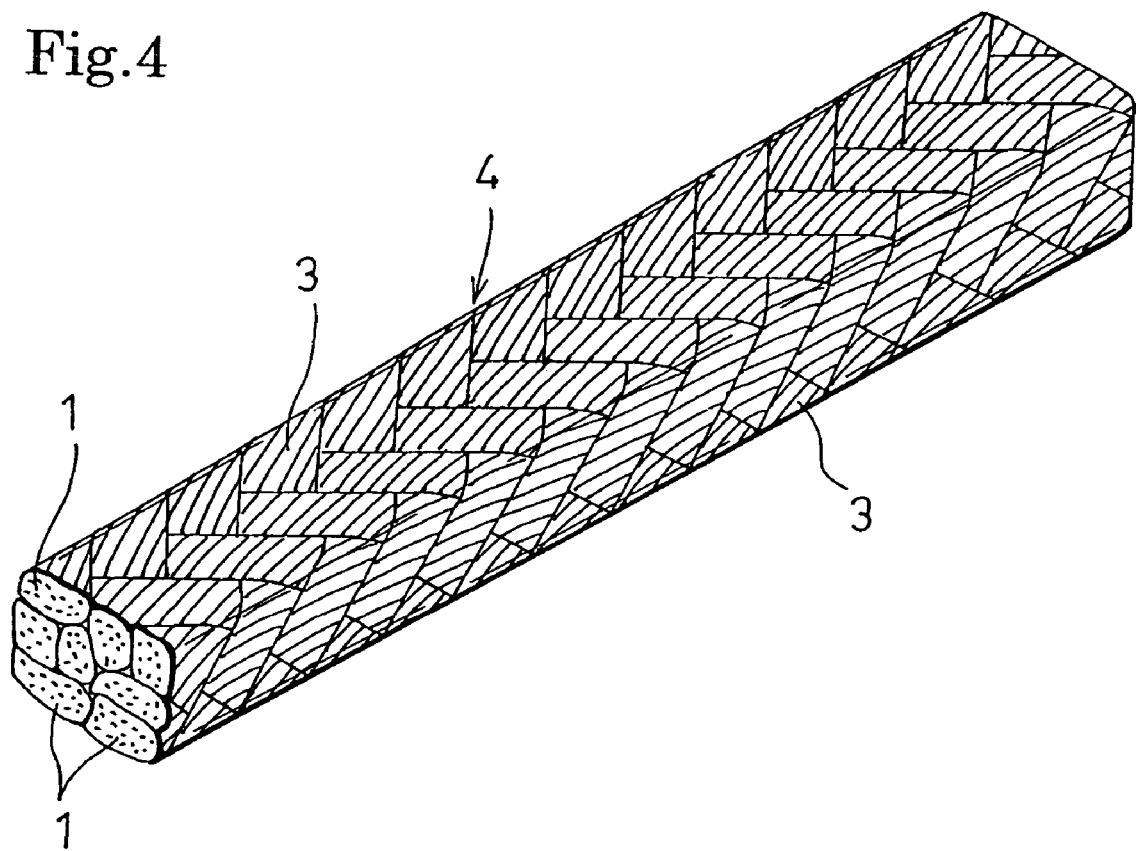
FIG. 4 is a perspective view showing an example of an embodiment of a gland packing according to the invention of claim 7.

Referring to FIG. 4, a gland packing 4 is formed by bundling eight braiding yarns made of expanded graphite 1 (1A, 1B) which are configured as described above, and applying the bundle to the eight-strand square braiding process. Of course, as the reinforcing wire member 3, a metal wire having a property in which the metal wire is easily plastically deformed, such as inconel or monel may be used in place of a stainless steel wire. Moreover, of course, the winding of the reinforcing wire member 3 may be formed as an external reinforcement of two spirals which are wound in opposite directions to intersect with each other.

The manner of braiding is not restricted to the eight-strand square braiding, and it is a matter of course that the sixteen-, eighteen-, twenty four-, or thirty two-strand square braiding, or the tubular braiding in which a core is inserted may be employed.

EXAMPLE 1-2

Braiding yarns made of expanded graphite 1A, 1B which are identical with the braiding yarns made of expanded graphite 1A, 1B having the single and two spiral configurations produced in the experiment of Table 1 above were produced. Gland packings which were braided by bundling eight, sixteen, twenty-four, or thirty-two braiding yarns made of expanded graphite 1A, 1B were bent with a radius of curvature of inner periphery of 20 mm or 10 mm, and presence or absence of a slack in the reinforcing wire members 3 on the inner peripheral side of the bent portion was observed. The results are listed in Table 3 below.

TABLE 3

| Kind of braiding | Radius of curvature of inner periphery | Slack on inner peripheral side of bent portion |
|---|---|---|
| 8 strand square braiding | 20 mm | None |
| | 10 mm | None |
| 16 strand square braiding | 20 mm | None |
| | 10 mm | None |
| 24 strand square braiding | 20 mm | None |
| | 10 mm | None |

TABLE 3-continued

| Kind of braiding | Radius of curvature of inner periphery | Slack on inner peripheral side of bent portion |
|---|---|---|
| 32 strand square braiding | 20 mm | None |
| | 10 mm | None |

In table 3 above, it was ascertained that no slack in the reinforcing wire member was produced on the inner peripheral side of the bent portion of the gland packing, not only in the case where the gland packing was bent with a radius of curvature of 20 mm of the inner periphery, but also in the case where the gland packing was bent with a smaller radius of curvature of 10 mm of the inner periphery.

The eight, sixteen, twenty-four, and thirty-two braiding gland packings which were used in the experiment of Table 3 above were formed into a ring-like shape having inner diameter of 32 mm, and used for sealing a stem. Under conditions of the tightening pressure of 39.2 MPa and the pressure of hot water×the temperature: 17.2 MPa×350° C., leaking of the hot water was checked after first, second, and third cycles of three hours (500 reciprocations). The results are listed in Table 4 below.

TABLE 4

| Kind of braiding | 1st cycle | 2nd cycle | 3rd cycle |
|---|---|---|---|
| 8 strand square braiding | None | None | None |
| 16 strand square braiding | None | None | None |
| 24 strand square braiding | None | None | None |
| 32 strand square braiding | None | None | None |

As shown in Table 4 above, it was ascertained that, in the all of the gland packings, leakage did not occur, and the sealing property is not adversely affected.

[Other Modifications]

Figure 5:
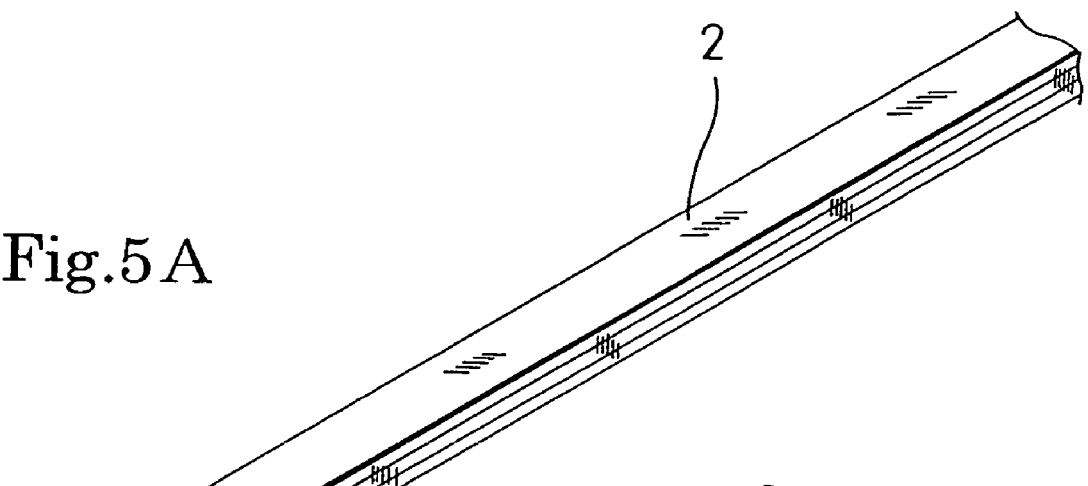
FIG. 5A is a diagram showing another embodiment of the expanded graphite base member.
FIG. 5B is a diagram showing a further embodiment of the expanded graphite base member.
FIG. 5C is a diagram showing a still further embodiment of the expanded graphite base member.
Figure 5:
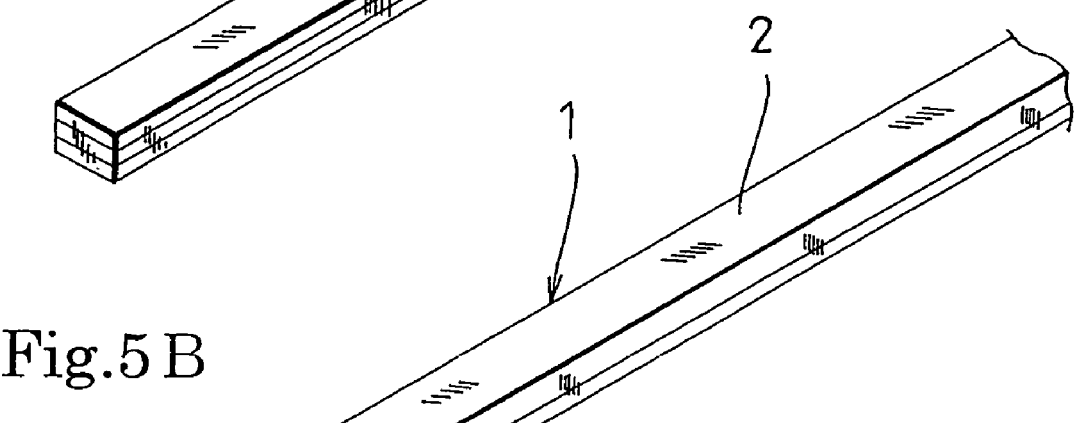
Figure 5:
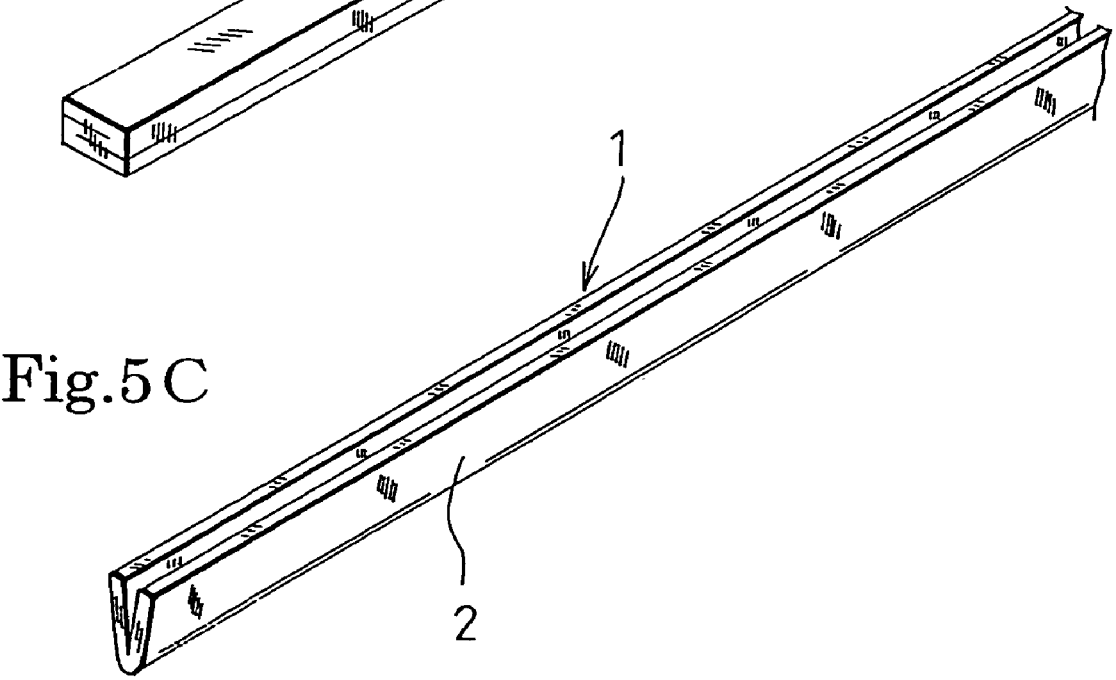

The expanded graphite base member 2 may be an expanded graphite base member 2 which is configured by stacking a plurality of expanded graphite tapes as shown in FIG. 5A, an expanded graphite base member 2 which is configured by folding an expanded graphite tape along the longitudinal direction as shown in FIG. 5B, an expanded graphite base member 2 which is configured by folding an expanded graphite tape along the longitudinal direction into a V-like shape as shown in FIG. 5C, or a rod-like or string-like expanded graphite base member 2 having a solid section. In addition, the expanded graphite base member may be an expanded graphite base member 2 which is configured by twisting the expanded graphite base member 2 shown in FIG. 5A, 5B, or 5C.

Of course, the form of the gland packing is not restricted to that which is obtained by braiding plural braiding yarns. For example, the gland packing may be produced by twisting plural braiding yarns.

In the above, the configurations in which the braiding yarns made of expanded graphite 1 of the inventions set forth in claims 1 to 6 are used as braiding yarns of the gland packing 4 have been described. The gland packing 4 of the invention is not restricted to these configurations, and may be configured as set forth in claims 7 to 12 after braiding or in the use.

Hereinafter, a second preferred embodiment of the invention will be described with reference to the drawings.

Figure 7A:
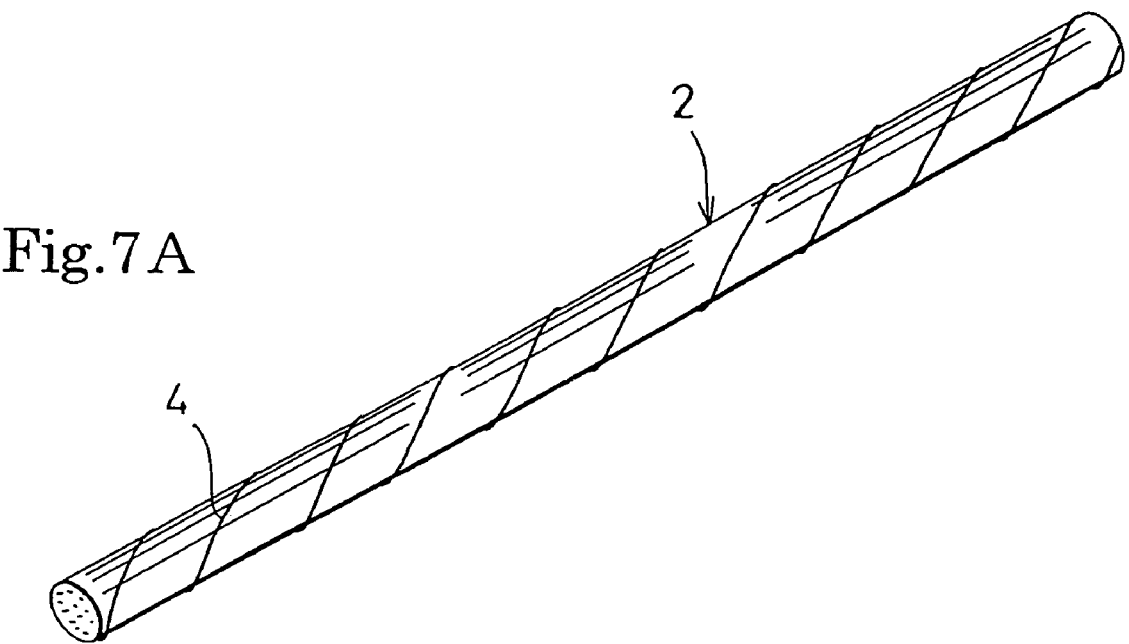
FIG. 7A is a perspective view showing an embodiment of an expanded graphite base member which is twisted.
Figure 7B:
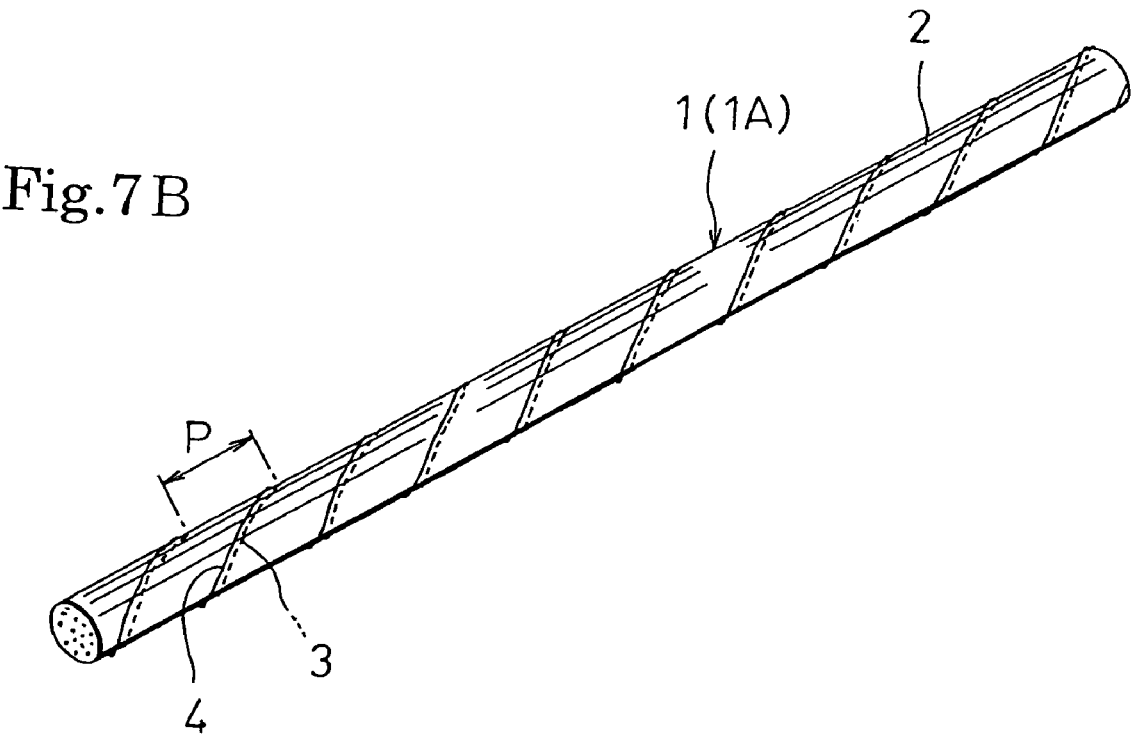
FIG. 7B is a perspective view showing an embodiment of a braiding yarn made of expanded graphite according to the invention of claim 13 or 14.

FIGS. 7A and 7B are perspective views respectively showing embodiments of a braiding yarn made of expanded graphite according to the inventions of claims 13 and 14. Referring to the figures, the braiding yarn made of expanded graphite 1 is configured by, as shown in FIG. 7B, winding a reinforcing wire member 3 formed by a metal wire which is easily plastically deformed, around the outer surface of an expanded graphite base member 2 which, as shown in FIG. 7A, is obtained by twisting an expanded graphite tape having a width of 2 to 30 mm (preferably, 10 to 30 mm) and a thickness of 0.10 to 0.50 mm (preferably, 0.20 to 0.40 mm), so that the reinforcing wire member is embedded in the inner side of and along an edge 4 of the expanded graphite tape which is spirally exposed from the outer surface of the expanded graphite base member 2. One or plural reinforcing wire members 3 are spirally wound so as to coincide with the twisting pitch of the expanded graphite tape. The reinforcing wire member 3 is spirally wound at a pitch P which is a narrow pitch of 0.5 to 5 mm, preferably a narrow pitch of 1 to 3 mm.

As the reinforcing wire member 3, a thin wire member of stainless steel (SUS 304) having a diameter of 0.05 to 0.2 mm, preferably 0.1 to 0.2 mm is used. The braiding yarn made of expanded graphite 1 is configured by spirally winding the stainless steel wire around the outer surface of the expanded graphite base member 2 by a tightening force of 0.1 to 30 N, preferably 10 to 20 N without slack, so that the reinforcing wire member is embedded in the inner side of and along the edge 4 of the expanded graphite tape.

As described above, the reinforcing wire member 3 is configured by a thin wire member having a diameter of 0.05 to 0.2 mm, and the thin reinforcing wire member 3 is embedded in the outer periphery of the expanded graphite base member 2 on the inner side of and along the edge 4 of the expanded graphite tape. Therefore, the reinforcing wire member can exert a sufficient resistance force due to the external reinforcement and against tensile and torsional forces produced in each of the braiding yarns 1 during the process of producing the gland packing.

The reinforcing wire member 3 is requested simply to be spirally wound around the outer surface of the expanded graphite base member 2. Therefore, the time period required in the process of the winding is very shorter than that required in the process of knitting or tubular-plain-stitching in the conventional art, and the productivity can be enhanced.

The reinforcing wire member 3 is configured by a thin wire member having a diameter of 0.05 to 0.2 mm, and embedded without being exposed from the outer surface of the expanded graphite base member 2. Therefore, the contact pressure and area of the expanded graphite base member 2 with respect to a counter member such as a rotation shaft or a stem can be sufficiently ensured, so that the adaptability and sealing property with respect to the counter member can be enhanced.

When the diameter of the reinforcing wire member 3 is smaller than 0.05 mm, the reinforcing wire member 3 is easily broken away during the winding process by the tightening force of 0.1 to 30 N, and therefore the configuration lacks the assuredness of the tight spiral winding on the outer periphery of the expanded graphite base member 2. When the diameter of the reinforcing wire member 3 is larger than 0.2 mm, the reinforcing wire member is hardly embedded in the inner side of the edge 4 of the expanded graphite tape. Therefore, it is preferable to configure the reinforcing wire member 3 by a thin wire member having a diameter of 0.05 to 0.2 mm, preferably 0.1 to 0.2 mm.

Figure 8:
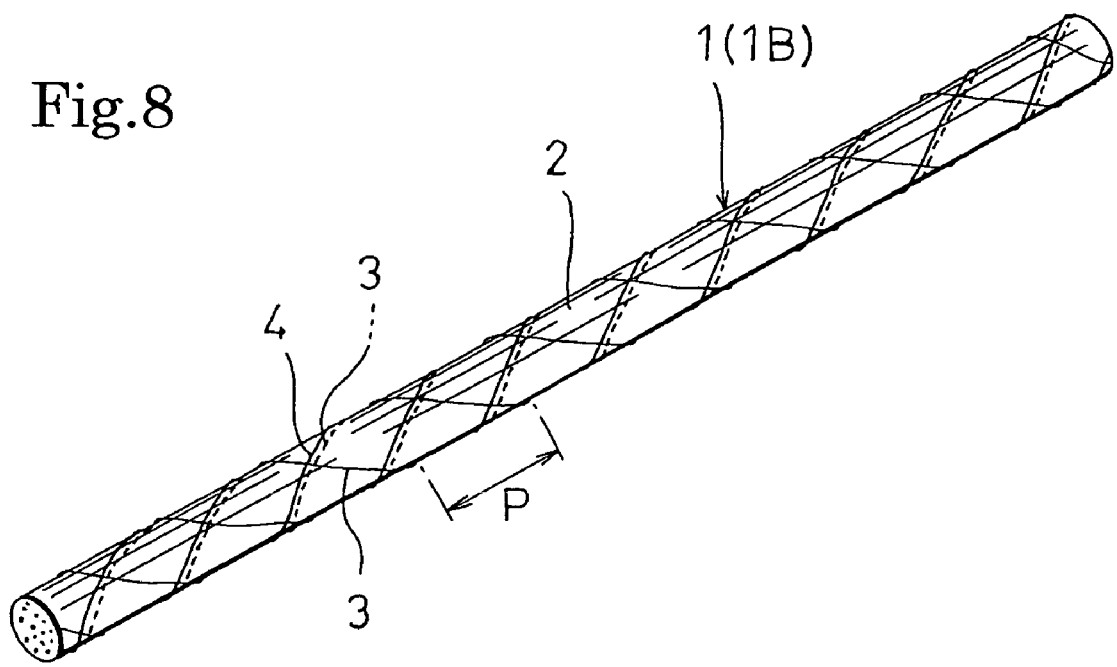
FIG. 8 is a perspective view showing another embodiment of the braiding yarn made of expanded graphite.

The reinforcing wire member 3 is not restricted to be spirally wound on the inner side and along the edge 4 of the expanded graphite tape of the expanded graphite base member 2 as shown in FIG. 7B. Alternatively, as shown in FIG. 8, one or plural other reinforcing wire members 3 may be used and oppositely spirally wound around the outer surface of the expanded graphite base member 2 so as to intersect with the above-mentioned spiral reinforcing wire member 3, thereby forming spiral windings which intersect with each other. In the alternative, when the pitch P of the latter reinforcing wire member 3 wound around the outer surface of the expanded graphite base member 2 is smaller than 0.5 mm, the surface coverage ratio of the reinforcing wire member 3 is excessively high. Therefore, the expanded graphite base member 2 hardly outward expands, the contact area of the expanded graphite base member 2 with respect to the counter member is reduced, and the adaptability and sealing property are reduced. When the pitch P is larger than 5 mm, even in the case where the reinforcing wire member 3 is wound around the outer periphery of the expanded graphite base member 2 without slack, the winding angle of the reinforcing wire member 3 with respect to the axis of the twisted expanded graphite base member 2 becomes small, and the reinforcing wire member 3 easily slacks. Therefore, it is necessary to wind the reinforcing wire member 3 around the outer periphery of the expanded graphite base member 2 at a narrow pitch of 0.5 to 5 mm.

Figure 9:
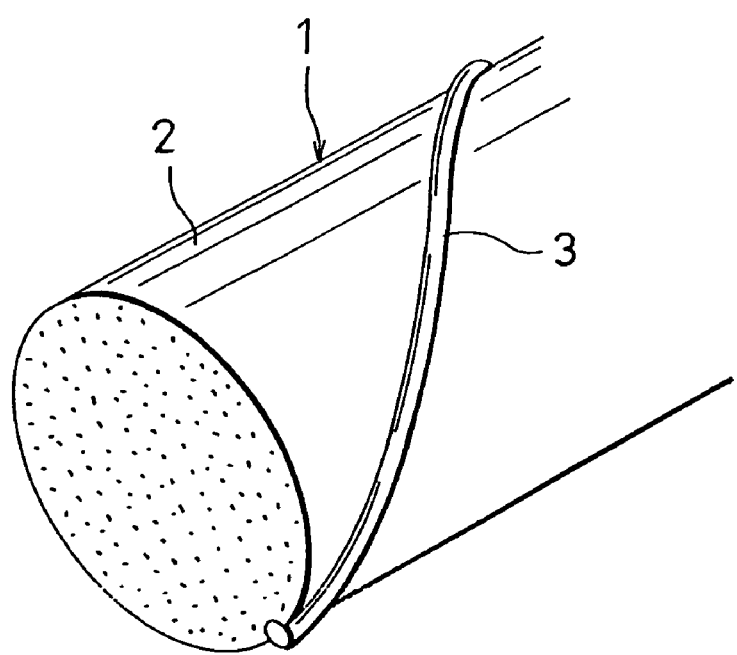
FIG. 9 is a perspective view showing an embodiment of a braiding yarn made of expanded graphite according to the invention of claim 15.

FIG. 9 is a perspective view showing an embodiment of a braiding yarn made of expanded graphite according to the inventions of claims 13 and 15. The braiding yarn made of expanded graphite 1 is configured by spirally embedding a thin reinforcing wire member 3 having a diameter of 0.05 to 0.2 mm in the outer surface of an expanded graphite base member 2 which is obtained by twisting an expanded graphite tape having a width of 2 to 30 mm (preferably, 10 to 30 mm) and a thickness of 0.10 to 0.5 mm (preferably, 0.20 to 0.40 mm), so that part of a section of the reinforcing wire member bites into the outer surface of the expanded graphite base member. In this case, the reinforcing wire member 3 may be spirally embedded so that the whole section of the reinforcing wire member bites into the outer surface of the expanded graphite base member 2. As required, two or more reinforcing wire members 3 may be used to bite the base member.

The winding of the reinforcing wire member 3 may be formed as an external reinforcement of two spirals which are wound in opposite directions to intersect with each other. In the same manner as the above described embodiment, the reinforcing wire member 3 is spirally wound as a single spiral at a narrow pitch of 0.5 to 5 mm, preferably a narrow pitch of 1 to 3 mm without slack.

Figure 10:
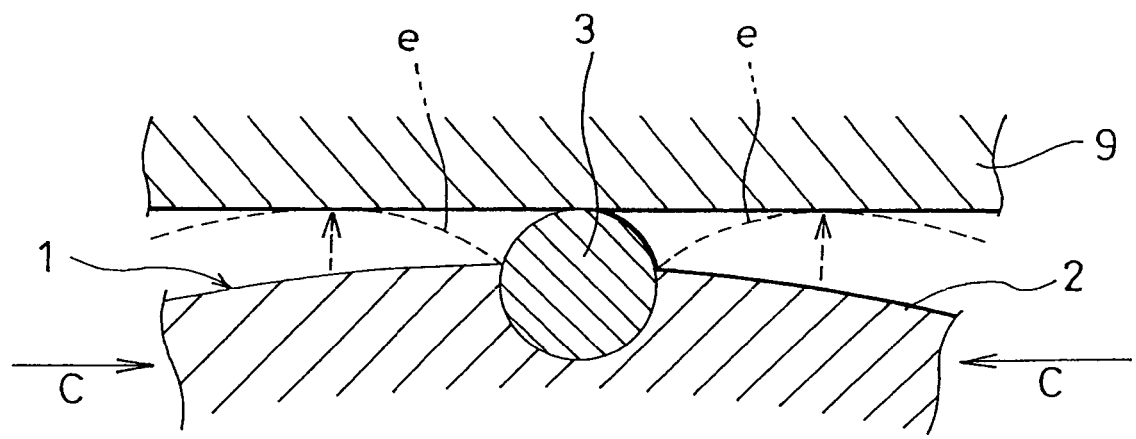
FIG. 10 is a view showing relationships between the braiding yarn made of expanded graphite of FIG. 9 and a counter member.

When the reinforcing wire member 3 is spirally embedded in the state where part or whole of a section of the reinforcing wire member 3 bites into the outer surface of the expanded graphite base member 2 as described above, the outer surface of the expanded graphite base member 2 can be made closer to a counter member 9 by a degree corresponding to the biting amount of the reinforcing wire member 3 as shown in FIG. 10. When the braiding yarn 1 is compressed in the directions C in the figure, therefore, the expanded graphite base member 2 outward expands as indicated by the broken lines e, whereby the contact pressure and area of the expanded graphite base member 2 with respect to the counter member 9 can be easily ensured, and the adaptability and sealing property with respect to the counter member 9 can be further improved.

Next, an embodiment of the gland packing according to the invention of claim 16 will be described.

Figure 11:
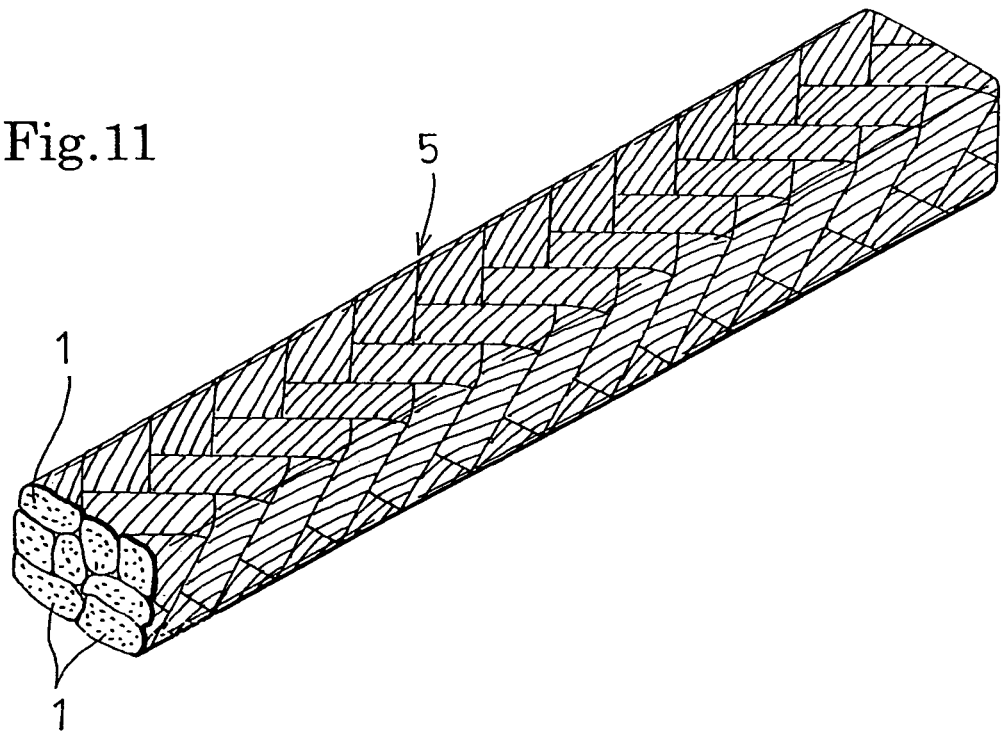
FIG. 11 is a perspective view showing an example of an embodiment of a gland packing according to the invention of claim 16.

As shown in FIG. 11, a gland packing 4 is formed by bundling eight braiding yarns or the braiding yarns made of expanded graphite 1 (1A) of FIG. 7B and the braiding yarns made of expanded graphite 1 (1B) of FIG. 8, and applying the bundle to the eight-strand square braiding process. Of course, as the reinforcing wire member 3 for the braiding yarns made of expanded graphite (1A) (1b), a metal wire having a property in which the metal wire is easily plastically deformed, such as inconel or monel may be used in place of a stainless steel wire. Moreover, the manner of braiding is not restricted to the eight-strand square braiding, and it is a matter of course that the sixteen-, eighteen-, twenty four-, or thirty two-strand square braiding, or the tubular braiding in which a core is inserted may be employed.

Other Embodiments

Figure 12A:
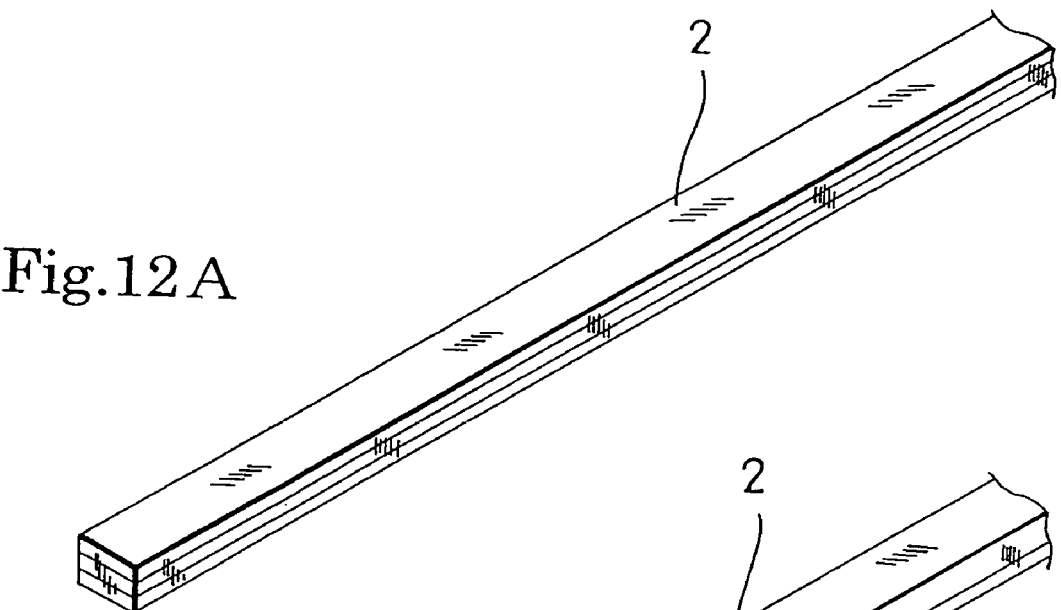
FIG. 12A is a diagram showing a still further embodiment of the expanded graphite base member.
Figure 12B:
FIG. 12B is a diagram showing a still further embodiment of the expanded graphite base member.
Figure 12C:
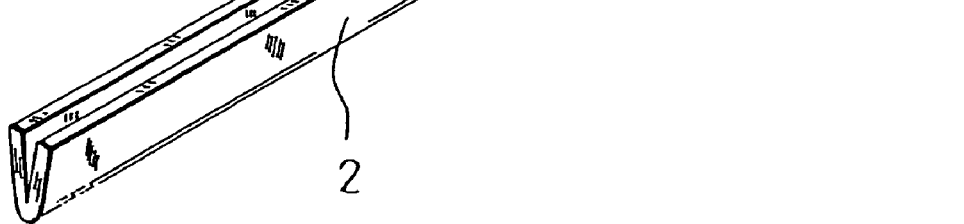
FIG. 12C is a diagram showing a still further embodiment of the expanded graphite base member.
Figure 15:
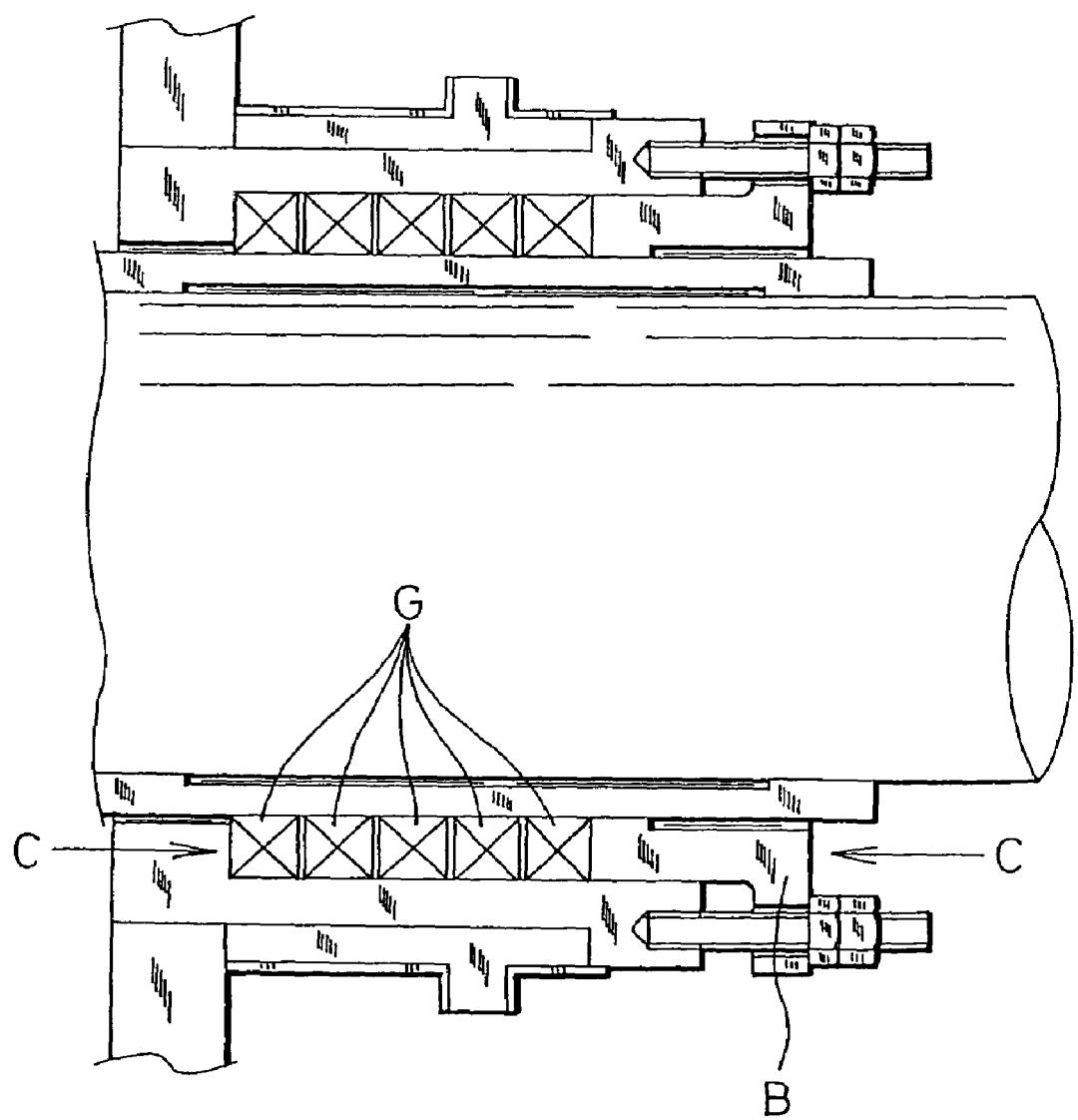
FIG. 15 is a diagram showing an example of a manner of using a gland packing.
Figure 16:
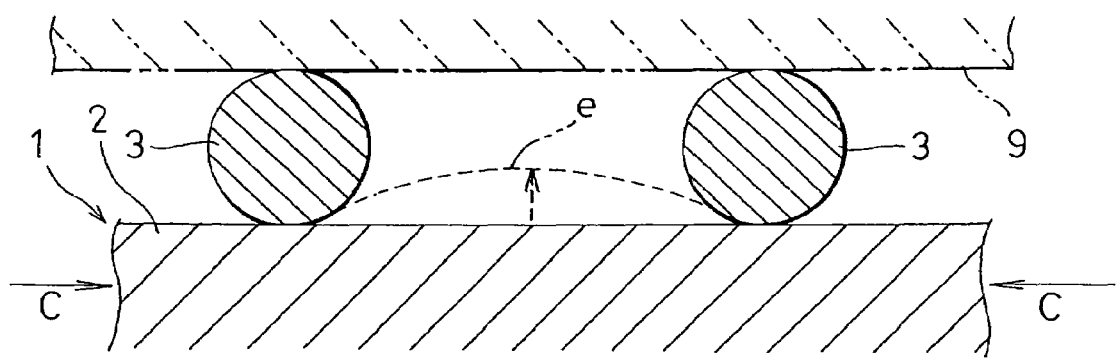
FIG. 16 is a diagram showing a situation where a conventional braiding yarn made of expanded graphite is in contact with a counter member.

The expanded graphite base member 2 may be an expanded graphite base member 2 which is configured by stacking a plurality of expanded graphite tapes as shown in FIG. 12A, an expanded graphite base member 2 which is configured by folding an expanded graphite tape along the longitudinal direction as shown in FIG. 12B, an expanded graphite base member 2 which is configured by folding an expanded graphite tape along the longitudinal direction into a V-like shape as shown in FIG. 12C, or a rod-like or string-like expanded graphite base member 2 having a solid section. In addition, the expanded graphite base member may be an expanded graphite base member 2 which is configured by twisting the expanded graphite base member 2 shown in FIG. 12A, 12B, or 12C.

Of course, the form of the gland packing 4 is not restricted to a gland packing having a form which is obtained by braiding plural braiding yarns made of expanded graphite 1. For example, the gland packing may be produced by twisting plural braiding yarns made of expanded graphite 1.

EXAMPLE 2-1

An example of the braiding yarn made of expanded graphite will be described. Expanded graphite tapes having a width of 20 mm and a thickness of 0.2 mm were twisted to form expanded graphite base members 2. The reinforcing wire member 3 of a stainless steel wire having a diameter of 0.05 to 0.2 mm was wound as a single spiral around the outer surfaces of the expanded graphite base members 2 at a pitch of 0.5 to 6.0 mm without slack so as to be embedded in the inner side of and along an edge 4 of each of the expanded graphite tapes, thereby producing braiding yarns made of expanded graphite 1A having an outer diameter of about 3 mm (the braiding yarn made of expanded graphite 1 of FIG. 7B). The reinforcing wire members 3 having the same diameter range as described above were wound as two spirals which intersect with each other, around the outer peripheries of the expanded graphite base members 2 at the same pitch as described above without slack, thereby producing braiding yarns made of expanded graphite 1B having an outer diameter of about 3 mm (the braiding yarn made of expanded graphite 1 of FIG. 8).

The thus produced braiding yarns made of expanded graphite 1A, 1B respectively having the single and two spiral reinforcing wire member configurations were formed into a ring-like shape having an inner diameter of 32 mm, and used for sealing a stem. Under conditions of the tightening pressure of 39.2 MPa and the pressure of hot water×the temperature: 17.2 MPa×350° C., leaking of the hot water was checked after first, second, and third cycles of three hours (500 reciprocations). The results are listed in the table of FIG. 13.

As apparent from the table, it was ascertained that the all of the braiding yarns made of expanded graphite 1A, 1B are excellent in adaptability and sealing property with respect to a stem, and are free from leakage.

EXAMPLE 2-2

An example of the gland packing will be described. Braiding yarns made of expanded graphite 1A, 1B which are identical with the braiding yarns made of expanded graphite 1A, 1B respectively having the single and two-spiral reinforcing wire member configurations produced in Example 2-1 were produced. Gland packings of the eight-, sixteen-, eighteen-, twenty four-, or thirty two-strand square braiding were produced by braiding a bundle of eight, sixteen, twenty-four, or thirty-two braiding yarns made of expanded graphite 1A, 1B. The gland packings were formed into a ring-like shape having an inner diameter of 32 mm, and used for sealing a stem. Under conditions of the tightening pressure of 39.2 MPa and the pressure of hot water×the temperature: 17.2 MPa×350° C., leaking of the hot water was checked after first, second, and third cycles of three hours (500 reciprocations). The results are listed in the table of FIG. 14.

As apparent from the table, it was ascertained that the all of the gland packings are excellent in adaptability and sealing property with respect to a stem, and are free from leakage.

What is claimed is:

1. A braiding yarn made of expanded-graphite wherein
a thin reinforcing wire member is spirally embedded in a longitudinal direction of an expanded graphite base member,
said thin reinforcing member has a diameter of 0.05 to 0.2 mm, and
said expanded graphite base member is fanned by a twisted expanded graphite tape, and all of said reinforcing wire is embedded under an inner side of and identically aligned with an edge of said twisted expanded graphite tape which is spirally exposed to an outer surface of said expanded graphite base member.

2. Use of a plurality of braiding yarns made of expanded graphite in a gland packing, wherein said plurality of braiding yarns are braided or twisted, and wherein
in each of said braiding yarns, a thin reinforcing wire member having a diameter of 0.05 to 0.2 mm is spirally embedded in a longitudinal direction of an expanded graphite base member, and
said expanded graphite base member of said braiding yarn is formed by twisted expanded graphite tape, and all of said reinforcing wire is embedded under an inner side of and identically aligned with an edge of said twisted expanded graphite tape which is spirally exposed from an outer surface of said expanded graphite base member.

* * * * *